United States Patent

Nakashima et al.

Patent Number: 6,137,085
Date of Patent: Oct. 24, 2000

[54] ARRANGEMENT OF HEATING STRIPS OF DEFOGGER ON VEHICLE WINDOW GLASS

[75] Inventors: Hiroshi Nakashima; Hiroshi Nagaiwa; Akihiko Matsumoto, all of Mie, Japan

[73] Assignee: Central Glass Company, Limited, Ube, Japan

[21] Appl. No.: 09/201,887

[22] Filed: Nov. 30, 1998

[30] Foreign Application Priority Data

Dec. 2, 1997 [JP] Japan ................................. 9-332210

[51] Int. Cl.[7] ...................................................... B60L 1/02
[52] U.S. Cl. .............................................................. 219/203
[58] Field of Search .................................. 219/200, 201, 219/202, 203, 212, 213, 217

[56] References Cited

U.S. PATENT DOCUMENTS

| | | | |
|---|---|---|---|
| 4,196,338 | 4/1980 | Edel | 219/203 |
| 4,707,586 | 11/1987 | Voss et al. | 219/203 |
| 5,182,431 | 1/1993 | Koontz et al. | 219/203 |
| 5,653,904 | 8/1997 | Adlparvar et al. | 219/203 |
| 5,886,321 | 3/1999 | Pinchok, Jr. et al. | 219/203 |

*Primary Examiner*—Tu Ba Hoang
*Attorney, Agent, or Firm*—Evenson, McKeown, Edwards & Lenahan, P.L.L.C.

[57] ABSTRACT

A vehicle window glass assembly comprises a window glass and a plurality of parallel, electric heating strips disposed on the window glass. The distance between adjacent two of the heating strips at least at portions thereof disposed in a central region of the window glass being in the range of 20 to 28 mm so that a quantity of heat generated by the heating strips per unit area can be smaller, i.e., 0.80 to 0.95 times of a reference electric power or a supply power for the heating strips can be 0.80 to 0.95 times of a reference electric power. The reference electric power is a power necessary for causing a surface temperature of a comparable window glass with comparable heating s trips to rise up to 90% of an equilibrium temperature in the range of 35 to 45° C., in 5 to 10 minute's time after energizing of the comparable heating strips starts, under the condition where the distance between adjacent two of the comparable heating strips at portions thereof disposed in a central region of the comparable window glass is in the range of 29 to 33 mm, a room temperature is 20° C., and windless.

1 Claim, 4 Drawing Sheets

A : PITCH; 29.85mm, POWER ; 200W
B : PITCH; 23.00mm, POWER ; 186W

A : PITCH; 29.85mm, POWER ; 232W
B : PITCH; 23.00mm, POWER ; 220W

A : PITCH; 29.85mm, POWER ; 200W
B : PITCH; 23.00mm, POWER ; 186W

ARRANGEMENT OF HEATING STRIPS OF DEFOGGER ON VEHICLE WINDOW GLASS

BACKGROUND OF THE INVENTION

1. Field of the Invention

The present invention relates to a vehicle heated window such as an automotive heated rear window, with a defogger for heating the window glass and thereby removing or preventing buildup of fog, ice or snow.

2. Description of the Related Art

In vehicles as automobiles, it is quite important to secure a good visibility for safety driving. Thus, defogging is indispensable not only to the windshield but to the rear window for paying attention to the rear at the time of driving in reverse gear or to the following cars. For this reason, a window glass having printed thereon a plurality of electric heating strips is used in the most automobiles.

It has heretofore been practiced to determine the distance between adjacent two of the heating strips at least at potions thereof disposed in the central region of the window glass so as to be included usually in the range of 29 to 33 mm.

This is because when the distance is too small the visibility in the rearward direction is deteriorated and when the distance is too large it is impossible to heat the window glass sufficiently. Heretofore, the resistance of the heating strips and the distance between adjacent two of them have been designed so that $(I^2R)/DL$ is nearly constant where I is supply current per one heating strip, i.e., the quantity of generated heat per unit area in the central region of the window glass, R is resistance, D is the distance between adjacent two of the heating strips, and L is the length of the heating strips in the central region of the window glass.

However, in case a vehicle is equipped with a battery of a small capacity, it is inevitable to sacrifice the defogging ability. As a result, there may occur such a case in which the quantity of generated heat is designed to be smaller than that obtained by the above described expression. On the other hand, there may occur another case in which the quantity of generated heat is designed to be larger than that obtained by the above described expression in case a vehicle is equipped with a battery of a large capacity or a vehicle is of the kind having the heating strips for the purpose of melting ice mainly.

According to a number of experiments carried out by the inventors of this application, it was found that the heating strips designed according to the above described concept had a problem in that the quantity of supply heat for heating the window glass up to a predetermined temperature in a predetermined time was generally too large.

SUMMARY OF THE INVENTION

According to an aspect of the present invention, there is provided a vehicle window glass assembly which comprises a window glass, and a plurality of parallel, electric heating strips disposed on the window glass. The distance of adjacent two of the heating strips at least at portions thereof disposed in a central region of the window glass is in the range of 20 to 28 mm so that a quantity of heat generated by the heating strips per unit area can be 0.80 to 0.95 times of a reference electric power or a supply power for the heating strips can be 0.80 to 0.95 times of a reference electric power. The reference electric power is a power necessary for causing a surface temperature of a comparable window glass with comparable heating strips to rise up to 90% of an equilibrium temperature in the range of 35 to 45° C., in 5 to 10 minute's time after it starts energizing of the comparable heating strips, under the condition where the distance between adjacent two of the comparable heating strips at portions thereof disposed in a central region of the comparable window glass is in the range of 29 to 33 mm, a room temperature is 20° C., and windless.

By various and repeated experiments conducted by the inventors of the subject application, it was found that the prior art arrangement of the heating strips had a problem in that the heat or power having heretofore been supplied to the heating strips for causing the window glass to rise up to a predetermined temperature within a predetermined time was too large. The present invention was made based on the discovery of such a problem.

The above structure is effective for solving the above noted problem inherent in the prior art device.

It is accordingly an object of the present invention to provide a novel and improved defogger which can reduce the quantity of heat necessary for defogging and therefore the amount of consumption of electric power.

It is a further object of the present invention to provide a vehicle window glass assembly having a defogger of the foregoing character.

DETAILED DESCRIPTION OF THE PREFERRED EMBODIMENT

Figure 1:
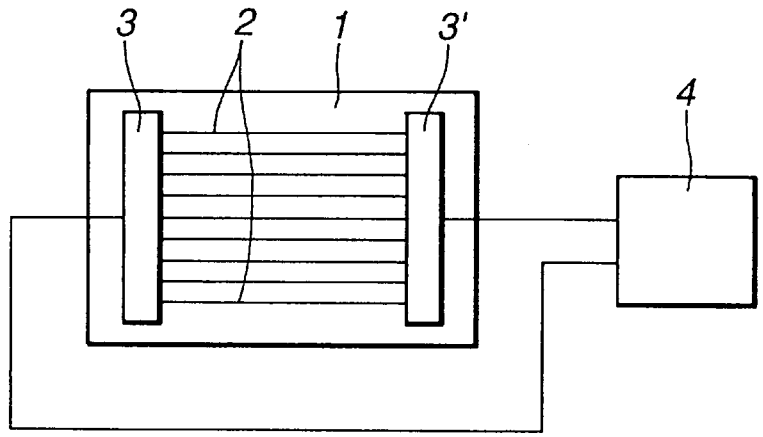
FIG. 1 is a diagrammatic view of an automotive vehicle window glass assembly with a defogger according to an embodiment of the present invention.

A vehicle window glass defogger according to the present invention includes, on a quadrilateral window glass which is, for example, 1100×700 mm and 3.5 mm thick, a pair of bus bars along the shorter sides of the window glass and a plurality of equidistant, parallel electric heating strips disposed between the bus bars and along the longer sides of the window glass, as for example seen from FIG. 1. The electric heating strips are formed by printing and baking conductive paste. The distance of adjacent two of the heating strips at least at portions thereof disposed in a central region of the window glass is in the range of 20 to 28 mm so that a quantity of heat generated by the heating strips per unit area can be 0.80 to 0.95 times of a reference electric power or a supply power for the heating strips can be 0.80 to 0.95 times of a reference electric power. The reference electric power is a power necessary for causing a surface temperature of a comparable window glass with comparable heating strips to rise up to 90% of an equilibrium temperature in the range of 35 to 45° C., in 5 to 10 minute's time after it starts energizing of the comparable heating strips, under the condition where the distance between adjacent two of the comarable heating strips at portions thereof disposed in a central region of the comparable window glass is in the range of 29 to 33 mm, a room temperature is 20° C., and windless. The above described arrangement of the heating strips according to the present invention will be described more in detail hereinafter.

Experiment 1

By fixing the distance between the uppermost strip and the lowermost strip to 530 mm, various examples having within that distance 14 (distance between adjacent two of the heating strips is 40.6 mm)to 106 (distance between adjacent two of the heating strips is 5.0 mm) heating strips were prepared. The heating strips were 1 m long and 0.5 mm wide.

Figure 3:
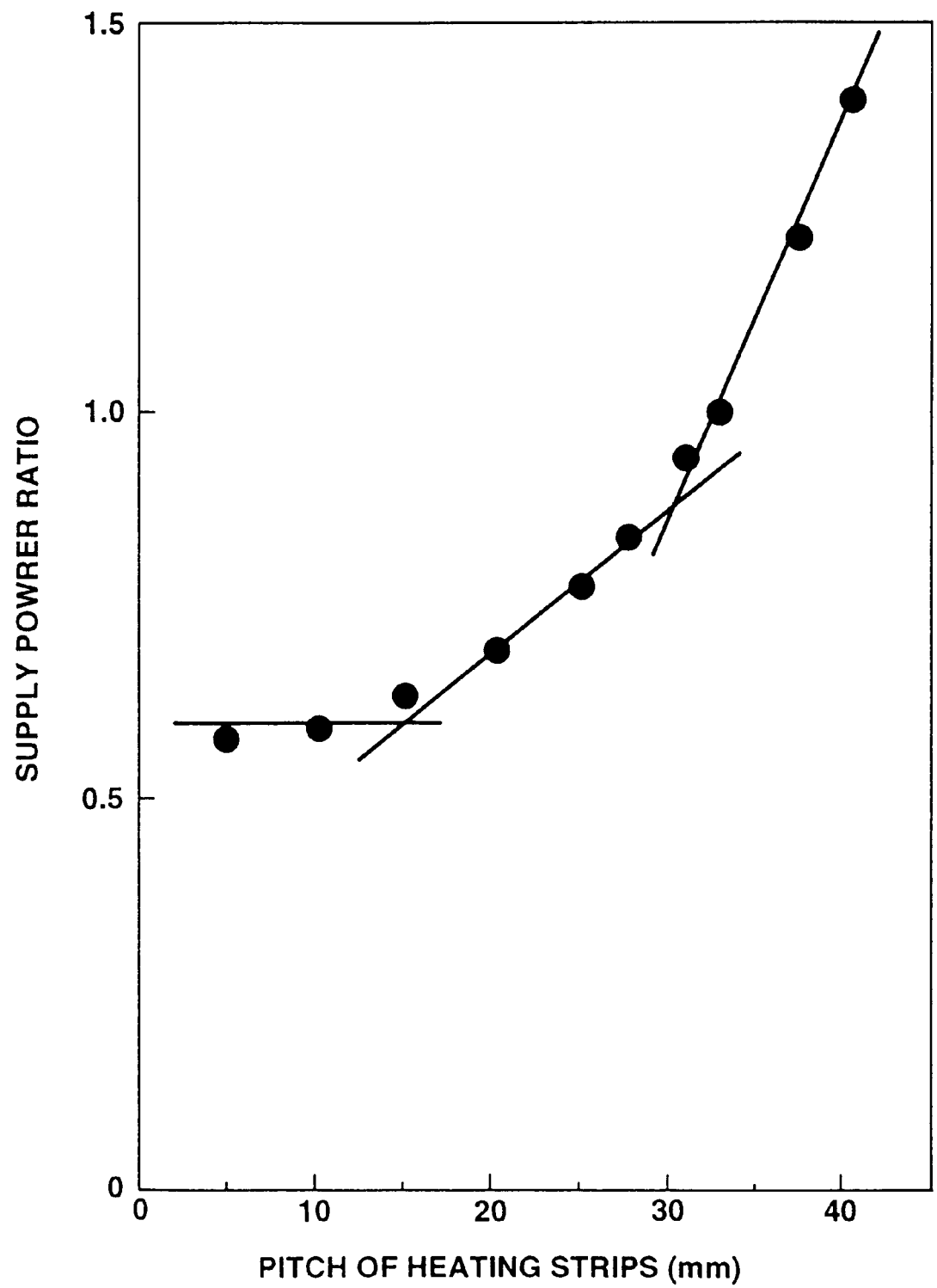
FIG. 3 is a graph showing a relation between distance (pitch) between adjacent two of the heating strips and supply power ratio according to the experiment 1.

By using the examples, a test was conducted for measuring a supply power necessary for the surface temperature of the window glass in the central region thereof and at the middle between the adjacent two of the heating strips to rise from the room temperature of 20° C. to 38.5° C. in five minute's time after energizing of the heating strips started. By the experiment, such a result shown in FIG. 3 was obtained. In the meantime, the ordinate of the graph of FIG. 3 represents a ratio of a measured supply power to a power which is necessitated to attain similar rise of the surface temperature when the distance between adjacent two of the heating strips is a typical value, i.e., 33 mm.

As will be apparent from this experiment, the supply power ratio converges to about 0.57 when the distance (pitch) between adjacent two of the heating strips is 15 mm or less, so it is nonsense to make the pitch shorter than 15 mm, while on the contrary when the pitch is 29 mm or more the supply power ratio increases rapidly with increase of the pitch, thus causing marked reduction of the heating efficiency.

By setting the pitch of the heating strips to 20 mm at the minimum and 28 mm at the maximum, the fog or the like can be removed from the window glass with a good heating efficiency.

Experiment 2

By using the same examples as in the experiment 1, an experiment was conducted to measure the supply power necessary for the temperature of the window glass in the central region thereof and at the middle of adjacent two of the heating strips to rise from the room temperature of 20° C. to 35° C. in five minute's time after energizing of the heating strips started. The result of this experiment was similar to that of the experiment 1 and therefore the similar supply power ratio to that shown in FIG. 3 was obtained.

From this result, it will be seen that the optimal distance between the adjacent heating strips is from 20 to 28 mm.

Experiment 3

Figure 4:
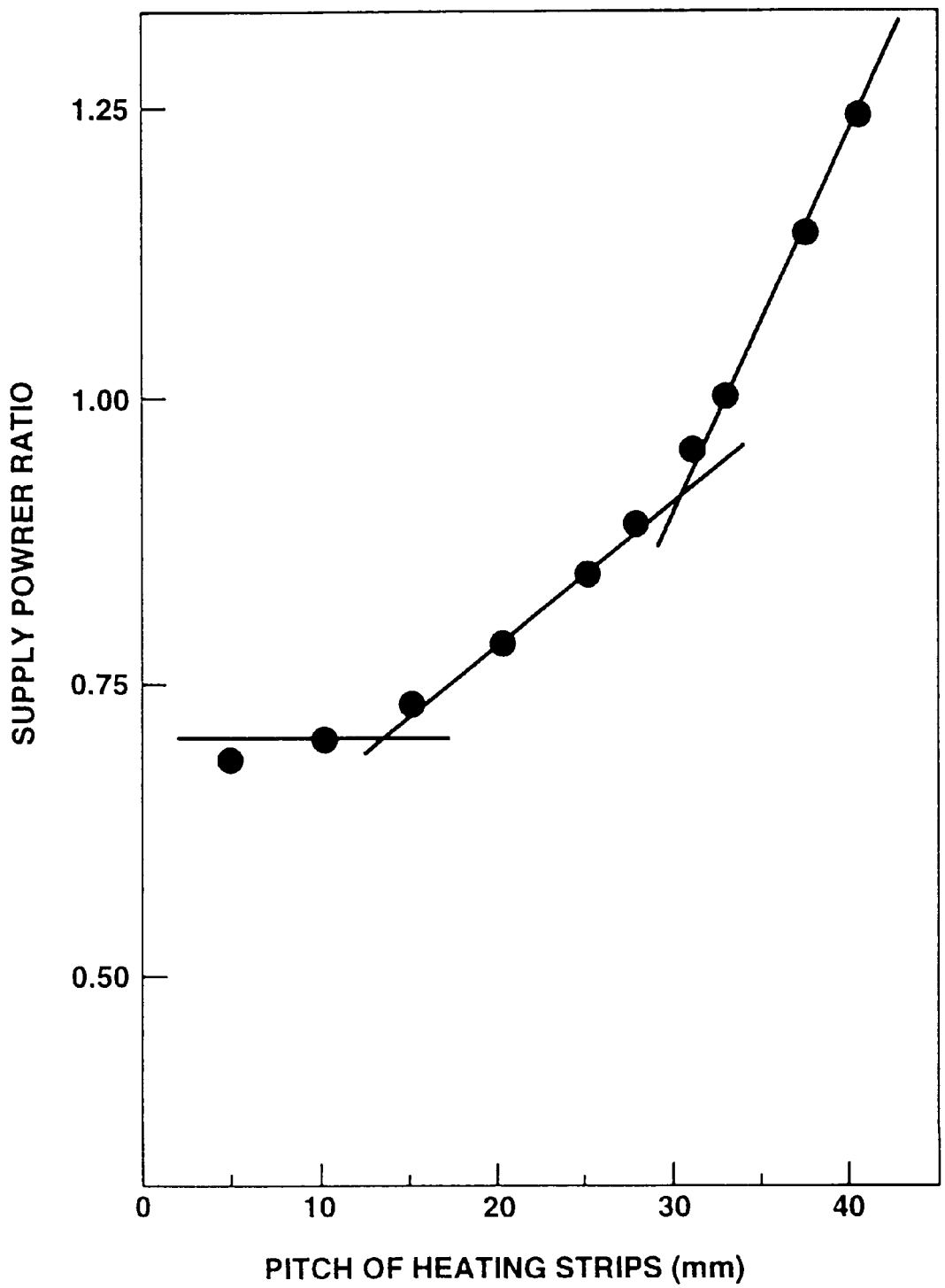
FIG. 4 is a graph showing a relation between distance (pitch) between adjacent two of the heating strips and supply power ratio according to the experiment 3.

By using the same examples as in the experiment 1, an experiment was conducted to measure the supply power necessary for the temperature of the window glass in the central region thereof and at the middle of adjacent two of the heating strips to rise from the room temperature of 20° C. to 35° C. in 7.5 minute's time after energizing of the heating strips started. By this experiment, such a result shown in FIG. 4 was obtained.

As will be apparent from this result, the result exhibits a similar tendency as that of the experiment 1 though a little different in the supply power ratio, so it will be understood that a suitable distance between adjacent two of the heating strips is from 20 to 28 mm.

From the experimental results as described above, it will be understood that by the arrangement in which the distance between adjacent two of the heating strips is in the range of 20 to 28 mm the heating efficiency can be made higher and the supply power can be reduced as compared with the prior art arrangement in which the distance between adjacent two of the heating strips is, for example, 33 mm.

This fact indicates that by making the distance between adjacent two of the heating strips smaller, even if the supply power is smaller, the temperature of the window glass at the middle between adjacent two of the heating strips can be caused to rise desirably within a shorter time as compared with the case in which the supply power is made larger to make the distance larger.

The kind and number of electric parts or components connected to a battery vary depending upon a variation of the kind of cars. In some car, its battery has a surplus of capacity. In such a case, the quantity of generated heat per unit area for the window glass can be made larger. On the contrary, in case the battery has no surplus of capacity, it may be obliged in some case to make smaller the quantity of generated heat per unit area for the window glass and sacrifice the defogging ability. Thus, a variation of the kind of car can cause a variation of the quantity of generated heat per unit area for the window glass. In case a relatively large supply power is available, a supply power necessary for causing the surface temperature of the window glass to rise up to at least 40° C., in 5 to 10 minute's time after energizing of the heating strips starts, under the condition in which the distance between adjacent two of the heating strips is 33 mm, the room temperature is 20° C. and windless may be determined as a reference power and 0.85 times of the reference power may be supplied to the heating strips. However, there may be a case where only a relatively small supply power is available. Thus, by determining a supply power necessary for causing the surface temperature of the window glass to rise from the room temperature of 20° C. up to about 90% of an equilibrium temperature in the range of 35 to 45° C., in 5 to 10 minute's time after energizing of the heating strips starts, as a reference power, such a reference power can be used as a reference value in all cases.

Figure 2:
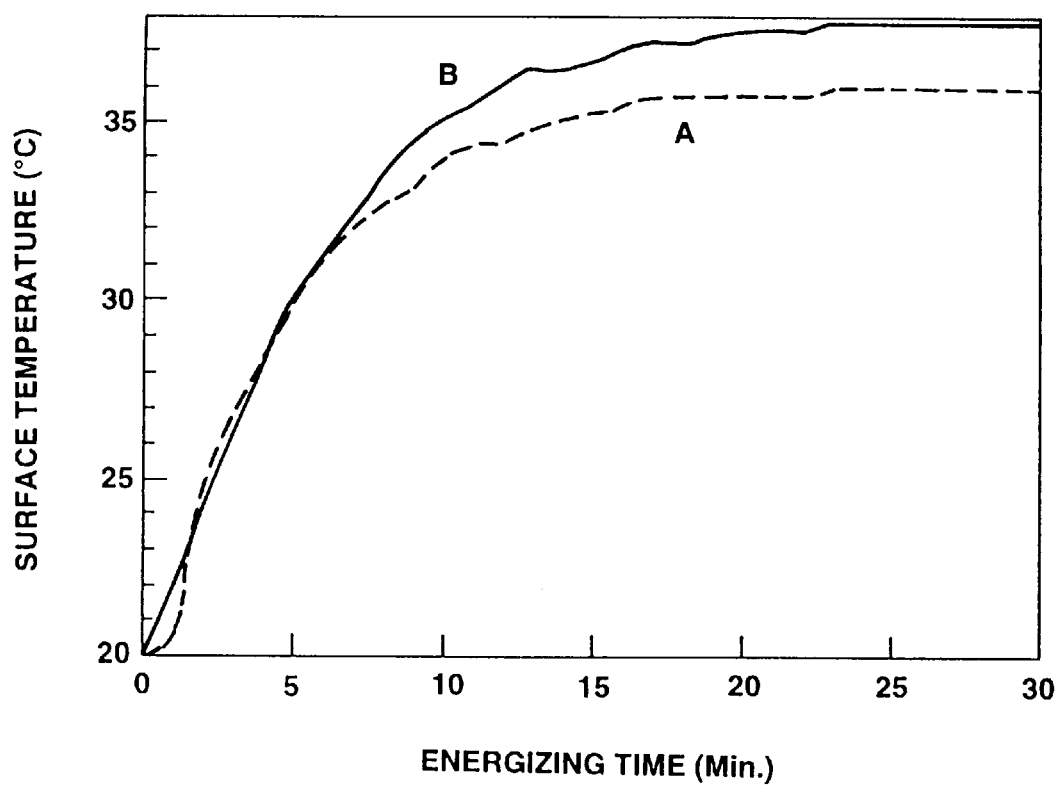
FIG. 2 is a graph showing a temperature rise characteristic, i.e., a relation between energizing time and resulting temperature, wherein the solid lid represents the invention and the dotted line represents a comparative example.

In this instance, the reason why the surface temperature is required to rise up to about 90% of the equilibrium temperature is that the time necessary for the surface temperature to rise up to the equilibrium temperature is 20 minutes or more as will be apparent from the temperature rise characteristic (FIG. 2) of the embodiment. By deterring the target temperature, up to which the surface temperature is to rise, as 90% of the equilibrium temperature, the time necessary for the surface temperature to rise up to the target temperature can be 10 minutes or less since the surface temperature varies abruptly or sharply at the zone of 90% of the equilibrium temperature. Further, the reason why the supply power is set to 0.80 to 0.95 times of the reference power in the arrangement of the present invention is that by making smaller the distance between adjacent two of the heating strips as in the present invention it becomes possible to attain similar rise of the surface temperature to that by the prior art arrangement in which the distance between adjacent two of the heating strips is 30 mm or so and the heating strips are supplied with the reference power.

For the heating strips in the arrangement of the present invention various kinds of electric heating strips such as one made of metal as copper having a positive temperature coefficient, one formed from a sintered body of metal and adhered to the window glass, and one formed by printing and baking paste containing metal as a basic component, as will be described hereinlater with respect to a preferred embodiment.

Further, other than the heating strips which are arranged horizontally as in the embodiment which will be described hereinlater, they can be arranged vertically. Further, the bus bars can be, other than of the type for supplying power to the heating strips on the both sides thereof, of the type in which one of the bus bars is divided into two sections and the other bus bar is used as a relay bus bar such that power is supplied to one of the bus bars.

In this instance, it becomes possible to regulate the surface resistivity of a sintered body of silver within the range of 5.5 to 7.0 mΩ/sq, and the width of the heating strips, which can be attained by screen printing, is in the range of 0.40 to 0.95 mm.

Accordingly, if the total quantity of heat kW which is available for defogging is known, a supply power per unit area for attaining a desired temperature rise is calculated, and a supply power is determined so as to be 0.95 times of the calculated power or less. Then, the distance between adjacent two of the heating strips is set to some value in the range of 20 to 28 mm, simultaneously with the width of the heating strips being calculated. By the optimal combination of the distance and the width which are obtained in the above manner, it is generally possible to determine the distance and the width of the heating strips.

In case the total quantity of heat is larger or smaller than the usual value of 150 W by 50 W or so, the distance between adjacent two of the heating strips is determined to be any typical conventional value in the range of 29 to 33 mm and then the number of heating strips and the surface resistivity (width) are determined, or the distance between adjacent two of the heating strips is first determined so as to be some value in the range of 20 to 28 mm. The window glass with such heating strips are prepared and subjected to a test for rise in its surface temperature for thereby determining a reference power at which the surface temperature rises up to 90% of the equilibrium temperature. Then, the distance between adjacent two of the heating strips can be determined within the range of 20 to 28 mm and then the surface resistivity (width) is determined so that the supply power can be 0.80 to 0.95 times of the reference power.

The present invention will be described more in detailed with reference to the drawings.

In FIG. 1, indicated by the reference numeral 1 is an automotive rear window glass which is a curved glass of the size of 1359×785 mm. On the inboard surface of the window glass 1 is printed and baked silver paste to form sixteen electric heating strips 2 (though only nine heating strips are shown) together with two bus bars 3 and 3' between which the heating strips 2 are disposed. Each heating strip 2 is 0.6 mm wide at its middle portion and has the surface resistivity of 6.51 mΩ/sq.

Such heating strips 2 are energized by applying thereto DC voltage of 12 V from a power unit including a battery 4 by turning on a manual switch (not shown) or by an output of a sensor (not shown).

With such a window glass defogger, the switch is turned ON under the condition where the outside air temperature is 15° C., the temperature inside a car is 25° C., the relative humidity is 70% (dew point: 19.1° C.) and the vehicle speed is from 50 to 60 Km, that is, under the condition where water vapor is deposited upon the inboard side surface of the window glass so that the window glass is completely clouded, to start energizing the heating strips, and the surface temperature of the window glass was measured by continuing the energizing of the heating strips 2 even after the fog or the like was removed from the window glass. By this measurement, such a result as indicated by the sold line in FIG. 5 was obtained.

The fog or the like was completely removed from the window glass when nine minutes lapses after turning ON of the switch and the temperature of the inboard side surface of the window glass rose up to nearly 20.0° C.

Further, the power consumption at this time was 186 W, so with a smaller power as compared with the power consumption of 200 W of a comparative example which will be described later the temperature of the inboard side surface of the window glass was caused to rise up to a higher temperature, whereby it was confirmed that the heating efficiency by the defogger of the present invention was considerably higher than that by the comparable prior art device.

COMPARATIVE EXAMPLE

A comparative example of a defogger was prepared so as to have substantially the same structure as the above described embodiment of the present invention except for that each heating strip was 0.7 mm wide at its middle portion, the surface resistivity was 5.89 mΩ/sq, and the distance between adjacent two of the heating strips was 29.85 mm. To such a comparative example of defogger was applied DC voltage of 12 V under the same condition as the above described embodiment and the temperature of the inboard side surface of the window glass was measured. Such a result as indicated by dotted line in FIG. 5 was obtained.

The fog or the like was removed nearly completely from the window glass when the temperature of the inboard surface of the window glass rose up to 20.3° C.

Figure 5:
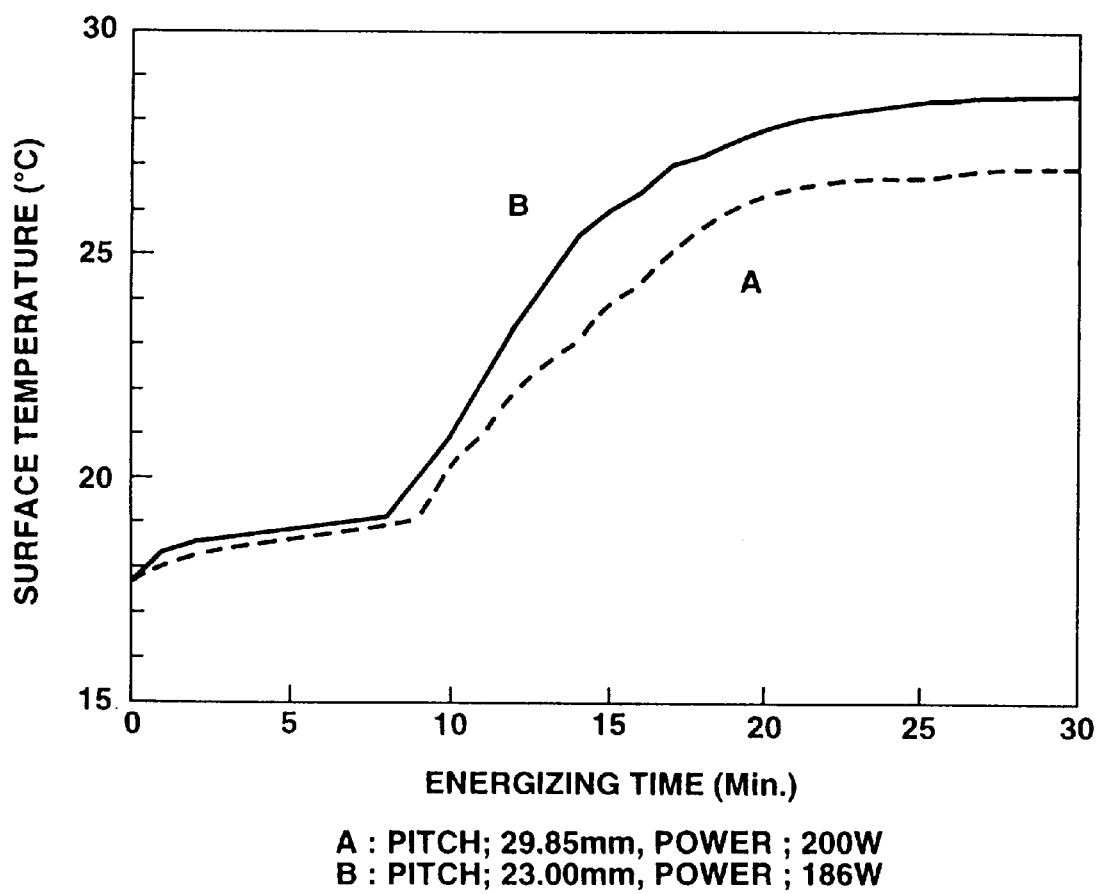
FIG. 5 is a graph similar to FIG. 2 but shows a temperature rise characteristic under a different condition.

Further, it will be seen from the graph of FIG. 5 that the power consumption at this time is 200 W and the heating efficiency of the comparative example is lower as compared with that of the embodiment of the present invention.

What is claimed is:

1. In a vehicle window glass assembly including a window glass and a plurality of parallel, electric heating strips disposed on the window glass, wherein when the heating strips are supplied with a reference electric power a predetermined quantity of heat per unit area sufficient to raise the surface temperature of the window glass in a windless environment from a room temperature of 20° C. up to 90% of an equilibrium temperature in the range of 35 to 45° C. is generated in 5 to 10 minutes after supply of the reference electric power to the heating strips starts where the distance between adjacent two of the heating strips at portions thereof disposed in a central region of the window glass is in the range of 29 to 33 mm, the improvement wherein the distance between adjacent two of said heating strips at least at portions thereof disposed in a central region of said window glass is modified to from 20 to 28 mm, and the resistance of said heating strips is modified so that an application of said reference electric power to said heating strips generates a reduced quantity of heat per unit area necessary for defogging and therefore to reduce a consumption of electric power which ranges from 0.80 to 0.95 times said predetermined quantity of heat per unit area at said central region.

* * * * *